(12) United States Patent
Takita et al.

(10) Patent No.: US 7,472,407 B2
(45) Date of Patent: Dec. 30, 2008

(54) OPTICAL DISC APPARATUS HAVING DYNAMIC DAMPER MECHANISM

(75) Inventors: Kohei Takita, Mitaka (JP); Hisahiro Miki, Chigasaki (JP); Kazuo Tsukiyama, Chigasaki (JP); Ikuo Nishida, Ebina (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 755 days.

(21) Appl. No.: 11/012,122

(22) Filed: Dec. 16, 2004

(65) Prior Publication Data

US 2005/0141357 A1    Jun. 30, 2005

(30) Foreign Application Priority Data

Dec. 19, 2003    (JP) ............................. 2003-422037

(51) Int. Cl.
*G11B 7/08*  (2006.01)
*G11B 7/09*  (2006.01)
*G11B 7/085* (2006.01)
*G11B 33/08* (2006.01)
*G11B 33/14* (2006.01)

(52) U.S. Cl. ..................... 720/692; 720/651
(58) Field of Classification Search .............. 369/44.14, 369/44.11; 720/648, 651, 692, 689
See application file for complete search history.

(56) References Cited

U.S. PATENT DOCUMENTS

| 5,612,935 | A  | * | 3/1997 | Ishimatsu ............... 369/44.14 |
| 6,356,525 | B1 | * | 3/2002 | Ikedo et al. ................. 720/675 |
| 6,690,638 | B1 | * | 2/2004 | Kiyomiya et al. ........... 720/651 |
| 6,859,933 | B2 | * | 2/2005 | Park et al. ................... 720/651 |
| 7,260,821 | B2 | * | 8/2007 | Amitani ....................... 720/651 |
| 2001/0008510 | A1 | * | 7/2001 | Nakayama et al. ......... 369/75.2 |
| 2003/0161253 | A1 | * | 8/2003 | Liao et al. ................... 369/263 |
| 2003/0227839 | A1 | * | 12/2003 | Yamamoto ............... 369/44.29 |
| 2005/0249056 | A1 | * | 11/2005 | Wang et al. .............. 369/44.14 |
| 2006/0130084 | A1 | * | 6/2006 | Chiu .......................... 720/651 |

FOREIGN PATENT DOCUMENTS

| JP | 2001-148151 | 5/2001 |
| JP | 2001-319436 | 11/2001 |

* cited by examiner

*Primary Examiner*—Andrea L Wellington
*Assistant Examiner*—Matthew G Kayrish
(74) *Attorney, Agent, or Firm*—Antonelli, Terry, Stout & Kraus, LLP.

(57) ABSTRACT

The invention provides an optical disc apparatus having a dynamic damper mechanism which does not use any part for exclusive use for absorbing a shock of an optical pickup. The optical disc apparatus is provided with a chassis attached to a base chassis via a first elastic body, shafts provided on the chassis, an optical pickup moving on the shaft, and a weight attached to the chassis via a second elastic body, the weight is provided with stoppers on a moving path of the optical pickup.

7 Claims, 2 Drawing Sheets

OPTICAL DISC APPARATUS HAVING DYNAMIC DAMPER MECHANISM

INCORPORATION BY REFERENCE

The present application claims priority from Japanese application JP-2003-422037 filed on Dec. 19, 2003, the content of which is hereby incorporated by reference into this application.

TECHNICAL FIELD

The present invention relates to a shock absorbing technique at a time when an optical disc apparatus is exposed to a shock due to drop or the like.

BACKGROUND ART

When the optical disc apparatus is exposed to the shock due to the drop or the like, a dropout or a deformation of an optical part within an optical pickup is generated, and there is a case that an optical disc reproducing and recording function is lost. Accordingly, it is essential to absorb the shock.

In the prior art, the structure is made such that a chassis holds a motor for rotating an optical disc, and a feeding mechanism for moving an optical pickup along a radial direction of the optical disc, and a shock absorbing member and a leaf spring are provided in terminal ends of a main shaft and an accessory shaft within the feeling mechanism, thereby absorbing the shock of the optical pickup (for example, refer to JP-A-2001-319436, which is hereinafter referred as patent document 1).

Further, in the other prior art, there is disclosed an optical disc apparatus structured such that a chassis mounted to a base chassis via a first elastic body holds a motor for rotating an optical disc, and a mechanism for relatively moving the optical disc and an optical pickup along a radial direction of the optical disc, a weight is attached to the chassis via a second elastic body, thereby employing a mechanism normally called as a dynamic damper mechanism, which removes an oscillation on the basis of an oscillation of the weight in an opposite phase to the oscillation at a time when the optical disc rotates and the oscillation is generated (for example, refer to JP-A-2001-148151, which is hereinafter referred as patent document 2).

However, since the patent document 1 is provided with the shock absorbing member and the leaf spring for exclusive use in order to absorb the shock of the optical pickup, the number of the parts is increased, a lot of labor hour and time are required for mounting, so that there is a problem that a cost increase is generated. Further, the patent document 2 mentioned above does not take into consideration the structure for absorbing the shock of the optical pickup.

BRIEF SUMMARY OF THE INVENTION

An object of the present invention is to provide an optical disc apparatus having a dynamic damper mechanism which does not use any part for exclusive use for absorbing a shock of an optical pickup.

The object mentioned above can be obtained by an optical disc apparatus that includes: a chassis attached to a base chassis via a first elastic body, a shaft provided on the chassis, an optical pickup moving on the shaft, and a weight attached to the chassis via a second elastic body. The weight is provided with a stopper on a moving path of the optical pickup.

In accordance with the present invention, it is possible to simply achieve a structure for absorbing the shock applied to the optical pickup, in the optical disc apparatus having the dynamic damper mechanism.

In the optical disc apparatus in accordance with the present invention, the structure may be made such that that the elastic body has a first flange and a second flange, and both the flanges are provided so as to hold the weight therebetween.

Further, in the optical disc apparatus in accordance with the present invention, the structure may be made such that that the weight is provided with the stopper near an end portion of the shaft.

Further, in the optical disc apparatus in accordance with the present invention, the structure may be made such that that the first flange and the second flange are integrally formed.

Other objects, features and advantages of the invention will become apparent from the following description of the embodiments of the invention taken in conjunction with the accompanying drawings.

DESCRIPTION OF THE PREFERRED EMBODIMENT

A description will be given below of an embodiment in accordance with the present invention with reference to the accompanying drawings.

Figure 1:
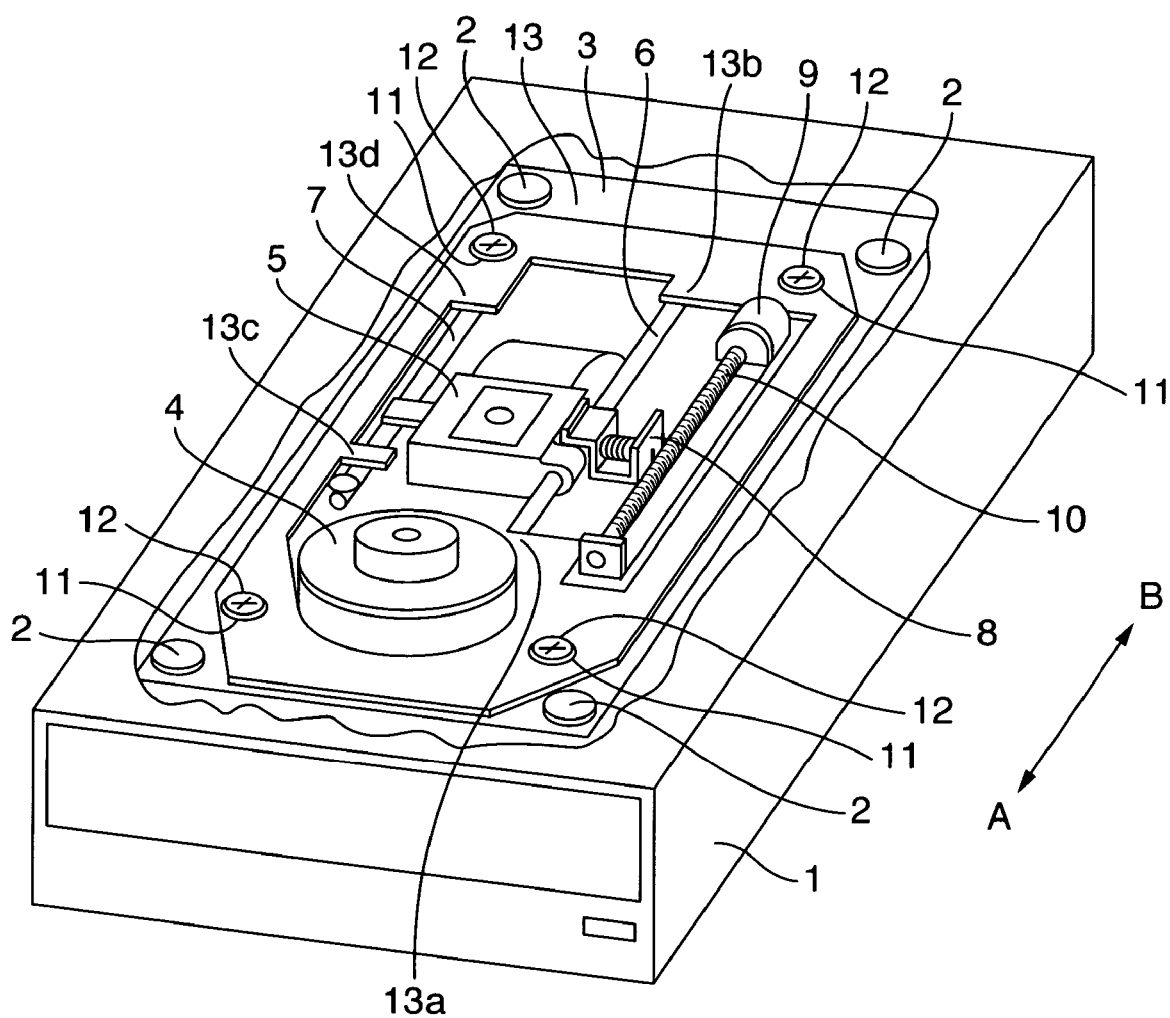
FIG. 1 is a schematic view of an embodiment of an optical disc apparatus in accordance with the present invention.

FIG. 1 is a schematic view of an embodiment of an optical disc apparatus in accordance with the present invention. In FIG. 1, in an inner portion of the optical disc apparatus 1, a chassis 3 attached to a base chassis (not shown) via an oscillation proof rubber 2 corresponding to an elastic body holds a spindle motor 4 for rotating a loaded optical disc (not shown), and a feeding mechanism for moving an optical pickup 5 along a radial direction of the optical disc.

In this case, the feeding mechanism is provided with a main shaft 6 and an accessory shaft 7 which are fixed to the chassis 3, the optical pickup 5 is held by the main shaft 6 and the accessory shaft 7, a guide pawl 8 attached to the optical pickup 5 is engaged with a screw portion 10 of a shaft of a stepping motor 9, and the optical pickup 5 moves in a direction of an arrow AB shown in the drawing on the basis of a rotation of the screw portion 10 of the stepping motor 9. A necessary moving range is approximately one half of the loaded optical disc (not shown).

The chassis 3 is provided with a weight 13 attached thereto via an oscillation proof rubber 11 corresponding to an elastic body by a locking screw 12, whereby a dynamic damper mechanism is structured. Next, a description will be given of this mechanism.

First, the oscillation generated on the basis of the rotation of the optical disc (not shown) attached to the spindle motor 4 held in the chassis 3 is transmitted via the chassis 3. When the oscillation reaches a preset oscillation frequency, the weight 13 starts oscillating in an opposite phase to the oscillation of the chassis 3, and brings out an effect of canceling the oscillation of the chassis 3 and reducing the oscillation. In most cases, the weight 13 is attached in parallel to the chassis 3 in a wide range.

On the other hand, when the optical pickup is exposed to a shock in a direction along the main shaft 6 and the accessory shaft 7 as in the direction of the arrow AB due to the drop of the optical disc apparatus 1 or the like, an engagement between the guide pawl 8 and the screw portion 10 is detached in some impact acceleration, and the optical pickup 5 is accelerated along the main shaft 6 and the accessory shaft 7, so that there is a case that the optical pickup 5 collides violently with inner and outer peripheral stoppers 13a, 13b, 13c and 13d provided in the weight 13 over a predetermined moving range in inner and outer peripheries.

At this time, if the subject with which the optical pickup 5 violently collides is a fixed part having no cushioning property such as the chassis 3 or the like, dropout or deformation of an optical part within the optical pickup 5 is generated in some acceleration of the collision, and there is a case that the reproducing and recording function of the optical disc is lost.

In order to prevent the condition mentioned above, in accordance with the present embodiment, a part of the weight 13 is formed in a stopper shape so as to be positively brought into contact with the optical pickup 5, and the oscillation proof rubber 11 of the dynamic damper mechanism is used also as a shock absorbing member having a damping function. In this case, in the present embodiment, the weight 13 is structured such as to have the stoppers at four positions, however, can be used at one position in correspondence to the circumstances, and the position to be used is not limited to four positions.

Figure 2:
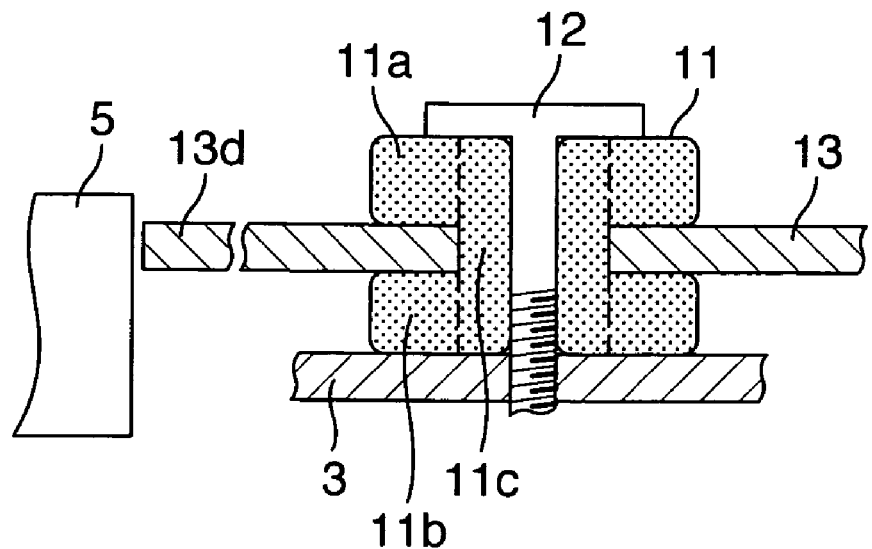
FIG. 2 is an enlarged side elevational view of a cross section along a center of an oscillation proof rubber 11 in FIG. 1, explaining a structure for absorbing a shock of an optical pickup 5.

FIG. 2 is an enlarged side elevational view of a cross section along a center of the oscillation proof rubber 11 in FIG. 1, and is an explanatory view of a structure for absorbing a shock of the optical pickup 5. The oscillation proof rubber 11 is constituted by a first flange 11a and a second flange 11b holding the weight 13 therebetween, and a shaft portion 11c existing between the flanges 11a and 11b and extending through the weight 13 so as to be in contact therewith, and a locking screw 12 is inserted to a through hole provided in a center of the shaft portion 11c and is attached to the chassis 3 by screwing into the chassis 3. In this case, the fixing structure using the screw is shown here, however, a suitable member fitting to the through hole may be employed.

In accordance with this structure, when the optical pickup 5 violently collides with the weight 13, for example, the stopper 13d of the weight 13, the shock can be absorbed by an elasticity of the shaft portion 11c of the oscillation proof rubber 11 held between the weight 13 and the locking screw 12.

Figure 3:
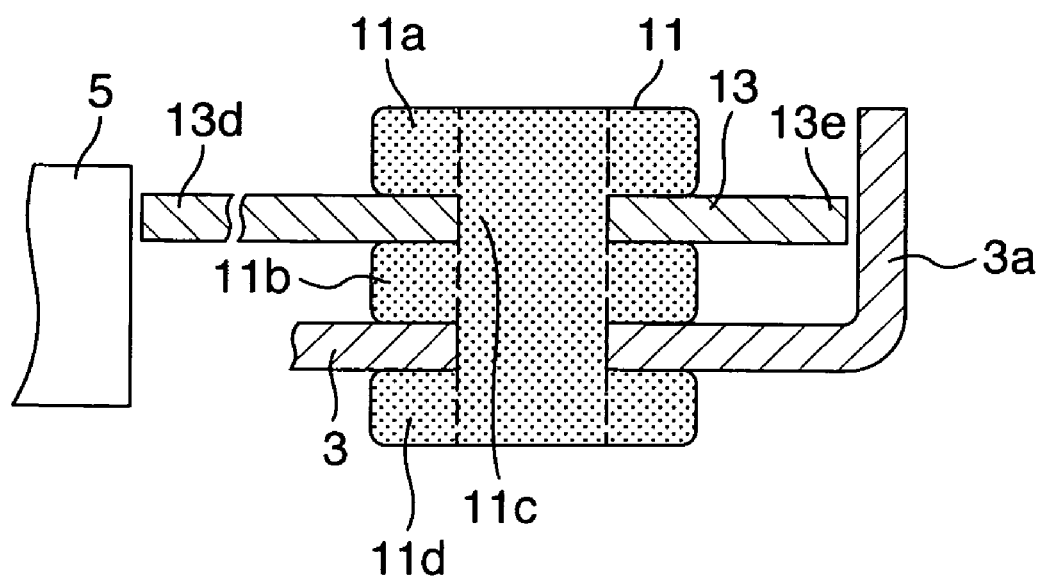
FIG. 3 is an enlarged side elevational view of a cross section along the center of the oscillation proof rubber 11 in FIG. 1, explaining the other structure for absorbing the shock of the optical pickup 5.

FIG. 3 is an enlarged side elevational view of a cross section along the center of the oscillation proof rubber 11 in the same manner as FIG. 2, and is an explanatory view of the other structure for absorbing the shock of the optical pickup 5. The oscillation proof rubber 11 is structured such that the first flange 11a, the second flange 11b, the shaft portion 11c and a third flange 11d are integrally formed. In this case, the shaft portion 11c extends to a lower side in comparison with the structure in FIG. 2 for the purpose of being integrally formed with the third flange 11d, and extends to a side of the third flange 11d.

In accordance with this structure, when the optical pickup 5 collides with any stopper of the weight 13, the shock can be absorbed by an elasticity of the shaft portion 11c of the oscillation proof rubber 11 held between the weight 13 and the locking screw 12.

Further, an opposing portion 3a opposing to an end portion 13e of the weight 13 is provided. An opposing portion from the base chassis may be opposed thereto in place of the opposing portion 3a.

In accordance with the structure mentioned above, in the case that the shock applied to the optical pickup 5 is great, it is possible to prevent the weight 1 from dropping out even if the oscillation proof rubber deflects largely.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disc apparatus comprising:
    a chassis attached to a base chassis via a first elastic body;
    a shaft provided on said chassis;
    an optical pickup moving on said shaft; and
    a weight attached to said chassis via a second elastic body, wherein said weight is provided with a stopper on a moving path of said optical pickup.

2. A optical disc apparatus as claimed in claim 1, wherein said elastic body has a first flange and a second flange, and both the flanges are provided so as to hold said weight therebetween.

3. An optical disc apparatus as claimed in claim 2, wherein said first flange and said second flange are integrally formed.

4. An optical disc apparatus as claimed in claim 1, wherein said weight is provided with said stopper near an end portion of said shaft.

5. An optical disc apparatus comprising:
    a chassis attached to a base chassis via a first elastic body;
    a main shaft and an accessory shaft provided on the chassis
    an optical pickup moving on the main shaft and the accessory shafts; and
    a weight attached to the chassis via a second elastic body, wherein said weight is provided with at least first and second stopper on a moving path of the optical pickup, and wherein the at least first stopper is positioned above an end portion of the main shaft and the at least second stopper is positioned above an end portion of the accessory shaft.

6. A optical disc apparatus as claimed in claim 5, wherein the elastic body has a first flange and a second flange, and both of the first and second flanges are arranged to hold the weight therebetween.

7. An optical disc apparatus as claimed in claim 6, wherein the first flange and said second flange are integrally formed.

* * * * *